(12) United States Patent
Brown et al.

(10) Patent No.: US 10,864,707 B2
(45) Date of Patent: *Dec. 15, 2020

(54) GLASS/METAL LAMINATED STRUCTURES AND METHODS OF MANUFACTURING LAMINATED STRUCTURES

(71) Applicant: CORNING INCORPORATED, Corning, NY (US)

(72) Inventors: Gordon Charles Brown, Watkins Glen, NY (US); Jeffrey Scott Cites, Horseheads, NY (US); William Keith Fisher, Corning, NY (US); Mark Stephen Friske, Campbell, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,340

(22) Filed: Nov. 29, 2018

(65) Prior Publication Data
US 2019/0091973 A1 Mar. 28, 2019

Related U.S. Application Data

(62) Division of application No. 14/432,799, filed as application No. PCT/US2013/062956 on Oct. 2, 2013, now Pat. No. 10,166,744.

(Continued)

(51) Int. Cl.
*B32B 17/10* (2006.01)
*B32B 17/06* (2006.01)
(Continued)

(52) U.S. Cl.
CPC .......... *B32B 17/10137* (2013.01); *B32B 7/02* (2013.01); *B32B 7/12* (2013.01);
(Continued)

(58) Field of Classification Search
CPC .... B32B 15/00–20; B32B 17/00–1099; B32B 7/00–14; B32B 37/00–30
See application file for complete search history.

(56) References Cited

U.S. PATENT DOCUMENTS 3,592,726 A 7/1971 Blizard
4,337,997 A 7/1982 Sadoune et al.
(Continued)

FOREIGN PATENT DOCUMENTS

GB 2074089 A 10/1981
JP 2012051220 A 3/2012
(Continued)

OTHER PUBLICATIONS

"Typical Properties of Surlyn Lonomer Grades" http://www.dupont.com//content/dam/dupont/products-and-services/packaging-materials-and-solutions/packaging-materials-and-solutions-landing/documents/Typical_Properties_of_Surlyn_.pdf. Accessed Mar. 9, 2016.
(Continued)

*Primary Examiner* — Prashant J Khatri

(57) ABSTRACT

Laminated structures comprise a metal sheet including a first face and a second face with a thickness of from about 0.5 mm to about 2 mm extending between the first face and the second face. The laminated structure further includes a first chemically strengthened glass sheet including a thickness of less than or equal to about 1.1 mm and a first interlayer attaching the first chemically strengthened glass sheet to the first face of the metal sheet. In further examples, methods of manufacturing a laminated structure comprise the steps of laminating with a metal sheet and a first chemically strengthened glass sheet together with an interlayer.

10 Claims, 10 Drawing Sheets

Related U.S. Application Data

(60) Provisional application No. 61/710,287, filed on Oct. 5, 2012.

(51) Int. Cl.

| | | |
|---|---|---|
| *C03C 15/00* | (2006.01) | |
| *C03C 21/00* | (2006.01) | |
| *B32B 7/02* | (2019.01) | |
| *B32B 15/08* | (2006.01) | |
| *B32B 15/04* | (2006.01) | |
| *B32B 15/18* | (2006.01) | |
| *B32B 7/12* | (2006.01) | |
| *B32B 15/098* | (2006.01) | |
| *B32B 37/10* | (2006.01) | |

(52) U.S. Cl.
CPC ............ *B32B 15/04* (2013.01); *B32B 15/08* (2013.01); *B32B 15/098* (2013.01); *B32B 15/18* (2013.01); *B32B 17/061* (2013.01); *B32B 17/10* (2013.01); *B32B 17/10018* (2013.01); *B32B 17/10036* (2013.01); *B32B 17/10743* (2013.01); *B32B 17/10761* (2013.01); *B32B 37/1018* (2013.01); *C03C 15/00* (2013.01); *C03C 21/00* (2013.01); *B32B 2307/546* (2013.01); *B32B 2307/558* (2013.01); *B32B 2307/584* (2013.01); *B32B 2311/24* (2013.01); *B32B 2311/30* (2013.01); *B32B 2419/00* (2013.01); *Y10T 156/10* (2015.01); *Y10T 156/1084* (2015.01); *Y10T 428/24967* (2015.01)

(56) References Cited

U.S. PATENT DOCUMENTS

| | | | |
|---|---|---|---|
| 4,483,700 A | 11/1984 | Forker, Jr. et al. | |
| 4,663,228 A | 5/1987 | Bolton et al. | |
| 5,674,790 A | 10/1997 | Araujo | |
| 6,660,387 B2 | 12/2003 | Oaku et al. | |
| 6,720,082 B1 | 4/2004 | Hashimoto et al. | |
| 7,291,386 B2 | 11/2007 | Richter et al. | |
| 7,666,511 B2 | 2/2010 | Ellison et al. | |
| 8,079,305 B2 | 12/2011 | Kron et al. | |
| 8,778,496 B2 | 7/2014 | Hart | |
| 8,973,401 B2 | 3/2015 | Borrelli et al. | |
| 9,096,463 B2 | 8/2015 | Hashimoto et al. | |
| 2004/0052080 A1 | 3/2004 | Hieda et al. | |
| 2004/0069770 A1 | 4/2004 | Cary et al. | |
| 2007/0172661 A1 | 7/2007 | Fechner et al. | |
| 2010/0151210 A1 | 6/2010 | Shimatani | |
| 2011/0064953 A1 | 3/2011 | O'Rourke et al. | |
| 2011/0165393 A1 | 7/2011 | Bayne et al. | |
| 2011/0267697 A1 | 11/2011 | Kohli et al. | |
| 2011/0267698 A1 | 11/2011 | Guilfoyle et al. | |
| 2014/0014260 A1 | 1/2014 | Chowdhury et al. | |
| 2014/0017455 A1 | 1/2014 | Takagi et al. | |
| 2014/0105953 A1 | 4/2014 | Beall et al. | |
| 2014/0212467 A1 | 7/2014 | Chen et al. | |
| 2015/0246507 A1 | 9/2015 | Brown et al. | |

FOREIGN PATENT DOCUMENTS

| | | |
|---|---|---|
| JP | 2012126582 A | 7/2012 |
| WO | 2013007100 A1 | 1/2013 |

OTHER PUBLICATIONS

Bennison et al; "High-Preformance Laminated Glazing for Structurally Efficienct Glazing"; Innovative Light-Weight Structures and Sustainable Facades, Hong Kong, (2008) pp. 1-12 (2008).
Chinese Office Action CN2030063463.6 dated Jun. 6, 2016, Chinese Patent Office.
International Search Report and Written Opinion PCT/US2013/062956 dated Nov. 28, 2013.
Japanese Office Action JP2015535749 dated Jul. 25, 2016, Japanese Patent Office.
JP2015535749 Final Office Action dated Feb. 28, 2017, Japan Patent Office.
Korean Patent Application No. 1020157011710; English Translation of the Office Action dated Jul. 3, 2020; Korea Patent Office; 2 pgs.

GLASS/METAL LAMINATED STRUCTURES AND METHODS OF MANUFACTURING LAMINATED STRUCTURES

CROSS REFERENCES

This application is a divisional application and claims the benefit of priority under 35 U.S.C. § 120 to U.S. application Ser. No. 14/432,799, filed Apr. 1, 2015, which claims the benefit of priority under 35 U.S.C. § 365 of International Patent Application Serial No. PCT/US13/62956 filed on Oct. 2, 2013, which also claims the benefit of priority under 35 U.S.C. § 119 to U.S. Provisional Application No. 61/710,287 filed on Oct. 5, 2012 the content of each is incorporated herein by reference in their entirety.

The present invention relates generally to glass/metal laminated structures and methods of manufacturing laminated structures and, more particularly, to glass/metal laminated structures including a chemically strengthened glass sheet and methods of manufacturing laminated structures including a chemically strengthened glass sheet.

BACKGROUND

Field of the Invention

Technical Background

It is known to provide a variety of apparatus, such as appliances, with an outer housing including a metal sheet. For example, typically, relatively thin metal sheets are used as an outer housing surface for an appliance. As such, the metal sheet provides a protection while also maintaining the outer appearance of the appliance. In a majority of in-use cases, it is observed that the metal outer housing sheet may lose its aesthetic appearance in a short period of time because of its poor scratch resistance, and poor cleanability with respect to fingerprints and oil smudges.

SUMMARY

In accordance with a first aspect, a laminated structure comprises a metal sheet including a first face and a second face with a thickness of from about 0.5 mm to about 2 mm extending between the first face and the second face. The laminated structure further includes a first chemically strengthened glass sheet including a thickness of less than or equal to about 1.1 mm and a first interlayer attaching the first chemically strengthened glass sheet to the first face of the metal sheet.

In accordance with one example of the first aspect, the first interlayer comprises layer of polyvinyl butyral.

In accordance with another example of the first aspect, the layer of polyvinyl butyral includes a thickness of from about 0.1 mm to about 0.8 mm.

In accordance with still another example of the first aspect, the first interlayer comprises an ionomer.

In accordance with yet another example of the first aspect, the thickness of the first interlayer is from about 0.1 mm to about 2 mm.

In accordance with a further example of the first aspect, the Young's modulus of the first interlayer is greater than or equal to 15 MPa.

In accordance with another example of the first aspect, the Young's modulus of the first interlayer is greater than or equal to 275 MPa.

In accordance with still another example of the first aspect, the first chemically strengthened glass sheet comprises an acid-etched glass sheet.

In accordance with yet another example of the first aspect, the first chemically strengthened glass sheet includes a thickness of from about 0.5 mm to about 1.1 mm.

In accordance with another example of the first aspect, the first chemically strengthened glass sheet comprises a glass selected from the group consisting of aluminosilicate glass and alkali-aluminoborosilicate glass.

In accordance with still another example of the first aspect, further comprising: a second chemically strengthened glass sheet including a thickness of less than or equal to about 1.1 mm; and a second interlayer attaching the second chemically strengthened glass sheet to the second face of the metal sheet.

In accordance with a second aspect, a method of manufacturing a laminated structure comprises the step (I) of providing a metal sheet including a first face and a second face with a thickness of from about 0.5 mm to about 2 mm extending between the first face and the second face. The method further includes the step (II) of providing a chemically strengthened glass sheet including a thickness of less than or equal to about 1.1 mm. The method still further includes the step (III) of attaching the chemically strengthened glass sheet to the first face of the metal sheet with a first interlayer.

In one example of the second aspect, step (II) provides the thickness of the chemically strengthened glass sheet within a range of from about 0.5 mm to about 1.1 mm.

In another example of the second aspect, step (II) includes the step of providing the glass sheet with a glass selected from the group consisting of aluminosilicate glass and alkali-aluminoborosilicate glass.

In still another example of the second aspect, the method further comprises the steps of separating a plurality of glass sheets from a source glass sheet, and chemically strengthening at least one of the plurality of glass sheets to provide the chemically strengthened glass sheet of claim (II).

In still another example of the second aspect, prior to the step of chemically strengthening the glass sheet, further comprising the step of finishing at least one edge of the glass sheet.

In still another example of the second aspect, wherein prior to step (III), further including the step of conditioning the first interlayer to control the moisture content.

In yet another example of the second aspect, wherein the step of conditioning adjusts the moisture content of the first interlayer to less than 1%.

In another example of the second aspect, step (III) includes the steps of building a stack with the interlayer placed between the chemically strengthened glass sheet and the first face of the metal sheet, placing the stack within vacuum chamber, at least partially evacuating the vacuum chamber, and heating the stack to a lamination temperature.

In a further example of the second aspect, wherein prior to step (III), further comprising the step of acid etching the chemically strengthened glass sheet.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
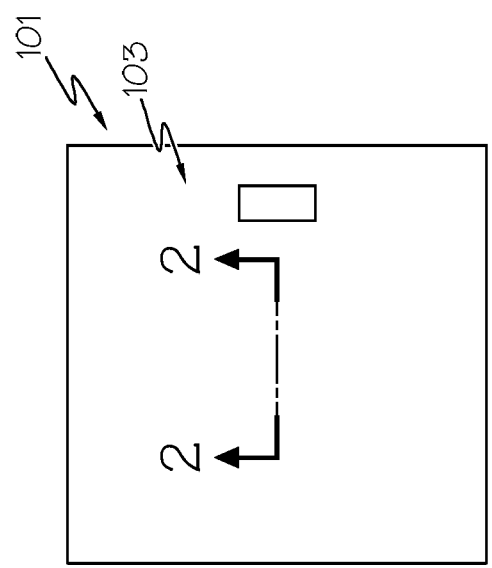
FIG. 1 is a schematic view of a cabinet incorporating a laminated structure in accordance with aspects of the disclosure.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Laminated structures may be used in a wide range of applications in accordance with aspects of the disclosure. For example, laminated structures may be used in various architectural applications such as siding, decorative panels, cabinet installations, wall coverings or other architectural applications. In further examples, the laminated structures may be used for furniture items and/or household appliances. For instance, the laminated structures may be incorporated as outer panels of a cabinet or other furniture and/or household appliance. For instance, FIG. 1 illustrates a schematic view of a cabinet 101 incorporating a laminated structure 103 in accordance with aspects of the disclosure. In on example, the cabinet 101 can be incorporated in a wall unit for storage. In another example, the cabinet can be refrigerated. For instance, the cabinet 101 can comprise a refrigerator and/or a freezer although various other nonrefrigerated examples may be alternatively provided.

Figure 2:
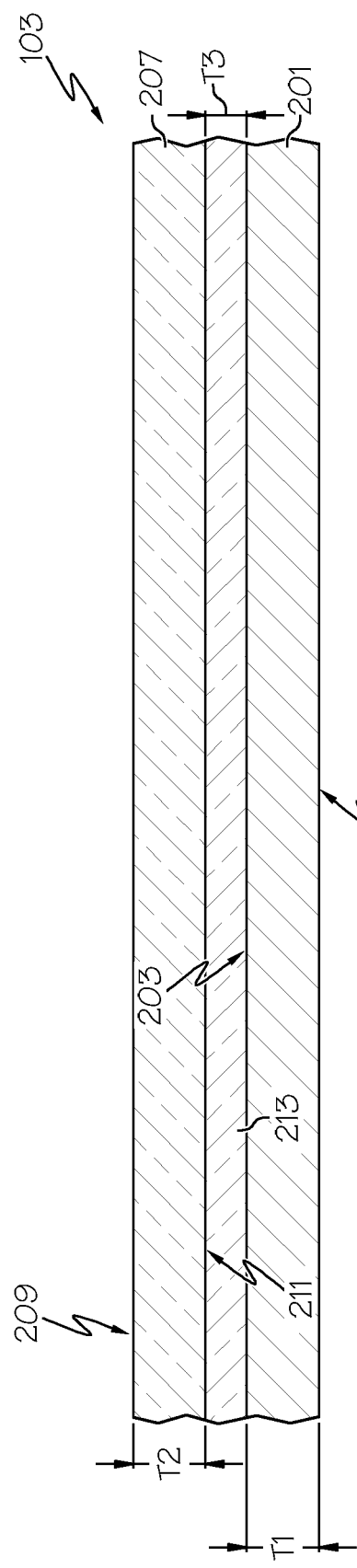
FIG. 2 is a partial cross sectional view of the cabinet along line 2-2 of FIG. 1 illustrating a laminated structure in accordance with aspects of the disclosure.

FIG. 2 illustrates an example partial cross section along line 2-2 of FIG. 1 for just one example wherein the laminated structure has been incorporated as an outer skin layer of a refrigerated cabinet (e.g., refrigerator and/or freezer). The laminated structure 103 may comprise the entire construction in use although the laminated structure 103 may be combined with other elements of the panel, such as an insulating layer and/or inner skin depending on the particular application.

As shown in FIG. 2, the laminated structure can include a metal sheet 201 that can comprise a wide range of metal types and/or a wide range of thicknesses and configurations. For instance, the metal sheet 201 can comprise steel, cold rolled steel, aluminum or other metal type. In one particular example, the metal sheet can comprise stainless steel. Stainless steel can have suitable application for outer panel constructions providing desired protection, resisting corrosion over time and providing a desired outer appearance, such as a brushed stainless steel appearance.

The metal sheet 201 can include a first face 203 and a second face 205 with a thickness T1 extending between the first face 203 and the second face 205. The thickness T1 of the metal sheet 201 can include a wide range of thicknesses depending on the particular application. Relatively thin metal sheets may be used in applications to reduce material costs and/or weight of the laminated structure while still providing sufficient resistance to deformation. In further examples, relatively thick metal sheets may be used in applications where further support is required to maintain the mechanical integrity of the laminated structure. In some examples, the thicknesses may range from 25 Gauge metal sheet (e.g., about 0.5 mm) up to 12 Gauge metal sheet (e.g., about 2 mm). In further examples, the thicknesses may range from 24 Gauge metal sheet (e.g., about 0.64 mm thick stainless steel) up to 16 Gauge metal sheet (e.g., about 1.59 mm thick stainless steel). As such, referring to FIG. 2, the thickness T1 of the metal sheet 201 can be from about 0.5 mm to about 2 mm, such as from about 0.64 mm to about 1.59 mm, although other thicknesses may be provided depending on the particular application.

As further illustrated in FIG. 2, the laminated structure 103 can further include a chemically strengthened glass sheet 207 including a thickness T2 extending between a first face 209 and a second face 211 of less than or equal to about 1.5 mm, such as less than or equal to 1.1 mm, such as from about 0.5 mm to about 1.1 mm, such as from about 0.55 mm to about 1.1 mm. In one particular example, the chemically strengthened glass sheet 207 has a thickness T2 of about 0.7 mm. In another example, the chemically strengthened glass sheet 207 has a thickness T2 of about 1 mm. The chemically strengthened glass sheet 207 can comprise a glass such as an aluminosilicate glass, and alkali-aluminoborosilicate glass, or other glass material.

Various glass forming techniques may be used to produce glass sheets 207 that may be incorporated within the laminated structure 103. For instance, fusion down draw techniques, fusion updraw techniques, slot draw techniques or other processes may be used to provide a glass ribbon that may be processed into glass sheets having the desired dimensional configuration. For instance, a fusion draw process can be provided to obtain a pristine surface. In some examples, display quality glass sheets 207 may be used to provide a transparent covering over the first face 203 of the metal sheets 201. Providing display quality glass can allow the aesthetic appearance of the first face 203 of the metal sheets 201 to be preserved. At the same time, the glass sheet 207 can help maintain the pristine surface quality of the first face 203 of the metal sheet 201. Indeed, scratches, smudging or other imperfections can be avoided due to the protective glass sheet 207 laminated with the metal sheet 201.

In one example, the glass sheets can comprise chemically strengthened glass such as Corning® Gorilla® glass from Corning Incorporated. Such chemically strengthened glass, for example, may be carried out in accordance with U.S. Pat. Nos. 7,666,511; 4,483,700 and 5,674,790. Chemical strengthening may be carried out by an ion exchange process. For instance, a glass sheet (e.g., aluminosilicate glass, alkali-aluminoborosilicate glass) may be made by fusion drawing and then chemically strengthening by immersing the glass sheet in a molten salt bath for a predetermined period of time. Ions within the glass sheet at or near the surface of the glass sheet are exchanged for larger metal ions, for example, from the salt bath. In one embodiment, the temperature of the molten salt bath is about 430° C. and the predetermined time period is about 8 hours. In another embodiment, the temperature of the molten salt bath is nearly 450° C. and the predetermined time period is about 4.5 hours.

The incorporation of the larger ions into the glass strengthens the sheet by creating a compressive stress in a near surface region. A corresponding tensile stress is induced within a central region of the glass sheet to balance the compressive stress. The chemical strengthening process of Corning® Gorilla® glass can have a relatively high compressive stress (e.g., from about 700 MPa to about 730 MPa; and even capable of greater than 800 MPa) at a relatively deep depth from the surface (e.g., about 40 microns; and even capable of greater than 100 microns). Such glass can have a high retained strength and high resistance to scratch damage, high impact resistance, high flexural strength as well as a pristine surface. One example glass composition can comprise $SiO_2$, $B_2O_3$ and $Na_2O$, where $(SiO_2+B_2O_3) \geq 66$ mol. %, and $Na_2O \geq 9$ mol. %.

In further examples, the chemically strengthened glass sheet 207 can comprise an acid-etched glass sheet to further strengthen the glass sheet. The introduction of acid etching may enable use of even thinner steel in the laminated structure of the disclosure without deterioration in impact performance. The acid etching step, in some examples, can remove from about 1.5 to about 1.7 microns from the surfaces of the chemically strengthened glass sheet 207. Acid etching addresses the fact that glass strength is extremely sensitive to the size and the tip shape of surface flaws. By removing the above-mentioned surface layer, the acid etching can clear away a majority of surface flaws smaller than 1 micron. While acid etching may not remove larger flaws, the acid etching procedure will tend to round the flaw tip which would otherwise dramatically decrease the stress concentration factor. The improvement in glass surface (e.g., removal of small surface flaws and rounding the tips of larger flaws) can dramatically increase glass strength, such as impact resistance. Moreover, only a relatively small depth of glass is removed, that will not result in significant compressive stress drop in the chemically strengthened glass sheet which has relatively high compressive stress at a much larger depth into the glass sheet such as 40 microns from the surface, or even greater than 100 microns in some examples.

In one example, the acid etching step can be conducted on a horizontal spray etching system, with a chemical solution of 1.5M HF/0.9M $H_2SO_4$. The other process parameters can include process temperature of 90° F. (32.2° C.), process time of 40 seconds, spray pressure of 20 psi, spray oscillation of 15 cycles per minute, and using 0.48 gallon-per-minute conical spray nozzles. After acid etching, the processed glass sheets may be cleaned with a rinse step using water, with the spray pressure of 20 psi and through 0.3 gallon-per-minute fanjet pattern nozzles. Then, the acid-etched chemically strengthened glass sheets may be dried under 5 hp air turbine supplying air with an air flow dryer system.

As still further illustrated in FIG. 2, the laminated structure 103 can further include an interlayer 213 attaching the first chemically strengthened glass sheet 207 to the first face 203 of the metal sheet 201. The interlayer 213 can be formed from a wide range of materials depending on the application and characteristics of the glass sheet and metal sheet. An optical clear interlayer can be provided that is substantially transparent, although opaque and possibly colored interlayers may be provided in further examples. In further examples, desirable images can be printed, with either screen printing or digital scanning printing, onto the glass side for aesthetic purposes or onto the interlayer. Because these printed images can be arranged on the interface (e.g., on the interlayer), they can be well preserved from scratch damages during the whole product lifetime. In addition or alternatively, the interlayer may comprise a transparent layer to allow clear viewing of the outer surface of the metal sheets. Indeed, the interlayer 213 can comprise a transparent interlayer 213 that provides an excellent optical interface between the glass sheet 207 and metal sheet 201. In some examples a display-quality glass sheet 207 may be laminated to the metal sheet 201 by the transparent interlayer 213 so that the outer appearance of the first face 203 of the metal sheet 201 may be easily viewed and preserved over time.

Still further, the interlayer 213 can be selected to help strengthen the laminated structure 103 and can further help arrest glass pieces from the glass sheet 207 in the event that the glass sheet 207 shatters. The interlayer can comprise various materials such as ethylene vinyl acetate (EVA), thermoplastic polyurethane (TPU), Polyester (PET), acrylic (e.g., acrylic pressure sensitive adhesive tape), polyvinyl butyral (PVB), SentryGlas® ionomer, or other interlayer material. If PET is used, in one example, the PET material can be sandwiched between two layers of acrylic adhesive material. In one example, the interlayer 213 can be selected to provide a Young's modulus greater than or equal to 15 MPa, such as a layer of polyvinyl butyral (PVB). In one example, the interlayer 213 of polyvinyl butyral can include a thickness of from about 0.1 mm to about 0.8 mm, such as from about 0.3 mm to about 0.76 mm, such as about 0.38 mm.

In a further example, the interlayer 213 can comprise a Young's modulus of the first interlayer greater than or equal to 275 MPa. For example the first interlayer can include an ionomer with a Young's modulus of greater than or equal to 275 MPa, such as about 300 MPa. In one example, the ionomer can comprise SentryGlas® ionomer available from DuPont. In such examples, the thickness of the interlayer 213 can be from about 0.1 mm to about 2 mm, such as from about 0.5 mm to about 1.5 mm, such as about 0.89 mm.

Figure 3:
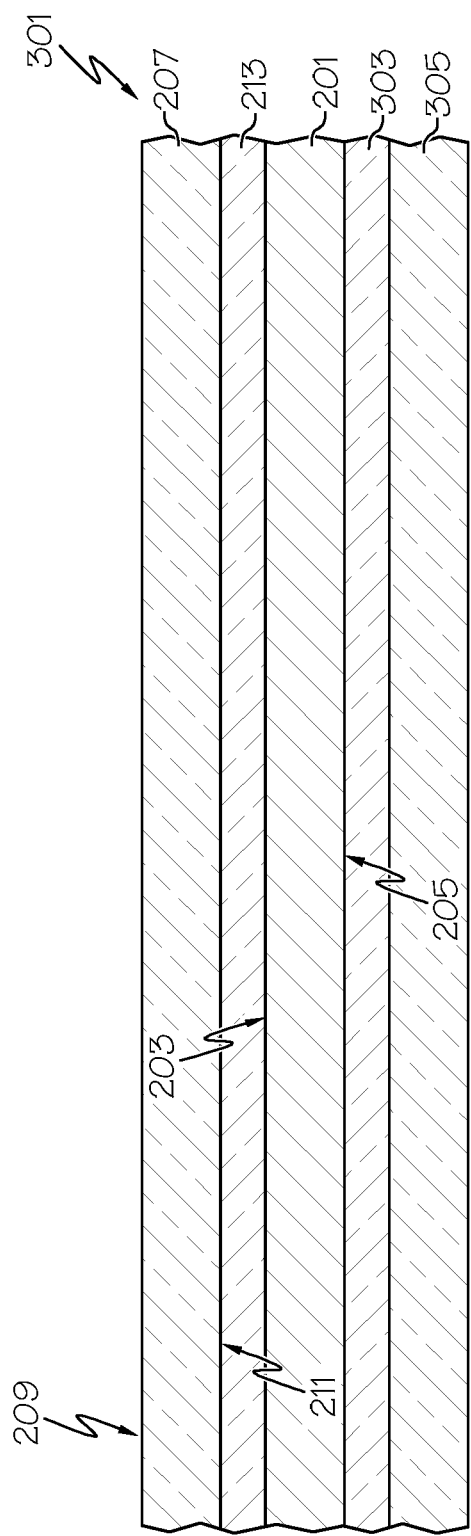
FIG. 3 is another cross sectional view illustrating another example laminated structure in accordance with further aspects of the disclosure.

FIG. 3 illustrates another example laminated structure 301 in accordance with first aspects of the disclosure. The laminated structure 301 can also include the interlayer 213 attaching the glass sheet 207 to the first face 203 of the metal sheet 201. As shown, the laminated structure 301 can also include a second interlayer 303 attaching a second chemically strengthened glass sheet 305 the second face 205 of the metal sheet 201. The second interlayer 303 can comprise the same material and have the same thickness T3 as the first interlayer 213. Likewise, the second chemically strengthened glass sheet 305, in some examples, can be identical to the first chemically strengthened glass sheet 207 including having the same thickness T2 and other features. Providing the laminated structure 301 can likewise provide the second chemically strengthened glass sheet 305 to protect the second face of the metal sheet 201 in the same way the first chemically strengthened glass sheet 207 protects the first face 203 of the metal sheet 201.

Figure 4:
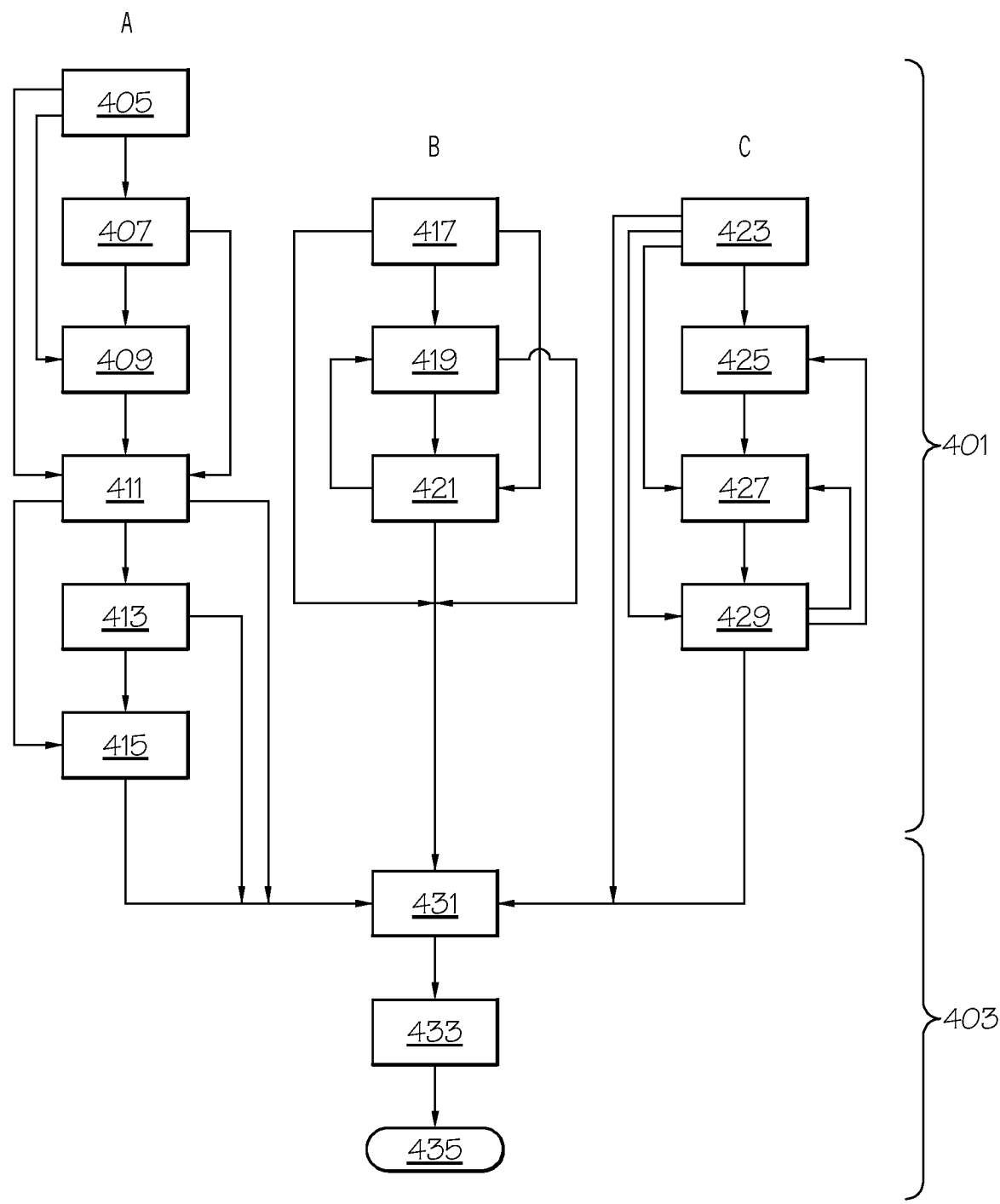
FIG. 4 is a flow chart illustrating examples steps of manufacturing laminated structures in accordance with aspects of the disclosure.

With reference to FIG. 4, example methods of manufacturing the laminated structures 103 will now be described with the understanding that similar or identical procedures maybe used to produce the laminated structures 301. The method begins with providing and/or preparing block 401 including providing and/or preparing the chemically strengthened glass sheet 207 (see column A), interlayer 213 (column B), and the metal sheet 201 (Column C). As described below, the method concludes with the lamination block 403 wherein the interlayer 213 attaches the chemically strengthened glass sheet 207 to the first face 203 of the metal sheet 201.

As shown in FIG. 4, column A demonstrates optional steps that may be carried out during a step of providing the chemically strengthened glass sheet 207. The method of providing and/or preparing the chemically strengthened glass sheet 207 can include the step 405 of providing a glass sheet with a desired thickness (e.g., see T2 in FIG. 2). As mentioned previously, the thickness T2 of the glass sheet 207 can be less than equal to about 1.5 mm, such as less than or equal to 1.1 mm, such as from about 0.5 mm to about 1.1 mm, such as from about 0.55 mm to about 1.1 mm. In one particular example, the glass sheet 207 has a thickness T2 of about 0.7 mm. In another example, the glass sheet 207 has a thickness T2 of about 1 mm. The glass sheet 207 can comprise a glass such as an aluminosilicate glass, and alkali-aluminoborosilicate glass, or other glass material. The glass sheet 207 can be provided by various techniques such as fusion down draw, fusion updraw, slot draw or other processes.

The method can then optionally proceed from step 405 to step 407 of separating a plurality of glass sheets from a source glass sheet. For example, a glass ribbon of aluminosilicate glass or alkali-aluminoborosilicate glass may be formed from a fusion down draw process with the desired thickness. Then a plurality of glass sheets may be cut from the glass ribbon and optionally further separated into a subset of glass sheets having the desire overall desired dimensions for the particular application. Separating a plurality of glass sheets can be carried out with a wide range of techniques. For example, processing can be selected to minimize adverse effects to glass strength due to its risk in introducing extra flaws, especially for thin glass. In one example, a 3 mm diameter scoring wheel with a tip angle of 110°, e.g., including diamond, may be used for the scoring operation. Meanwhile, the applied force of approximately 0.8 kgf may be used for the scoring force.

The glass sheet having the desired size from step 407 may then be further optionally processed during step 409 to machine or otherwise finish at least one edge of the glass sheet 207 prior to the step of chemically strengthening the glass sheet 207. For example, step 409 may include the step of edge grinding and finishing to round or bevel the edge to the required profile to reduce sharp edges, improve aesthetics and edge strength. In one example, a profiled diamond wheel of 400# (mesh size of diamond abrasive) may be used in a wide variety of applications. Other processing parameters can include a grinding speed of from about 10 m/sec to about 30 m/sec, a feed rate of about 0.5 m/min, and a grinding depth of from about 0.1 mm to about 0.2 mm. If a higher edge strength is required, a subsequent grinding step may be carried out with an 800# diamond wheel. Such optional subsequent grinding step can including processing parameters, for example of a grinding speed of from about 10 m/sec to about 30 m/sec, a feed rate of about 0.5 m/min, and a grinding depth of from about 0.05 mm to about 0.1 mm.

Once the desired size is obtained (e.g., during step 407) and any edges are machined or otherwise finished (e.g., during step 409), the glass sheet may be chemically strengthened during step 411. For example, as discussed above, the chemical strengthening step may comprise an ion exchange chemical strengthening technique used to generate Corning® Gorilla® glass. Still further, after chemically strengthening during step 411, optionally, the chemically strengthened glass sheet 207 may be acid etched during step 413. Acid etching may be carried out with exemplary procedures discussed above to further strengthen the glass sheets as desired for particular applications.

Optionally, before entering the lamination block 403 of the method for manufacturing, the glass sheet may be cleaned during step 415. Cleaning may be designed to remove surface dirt, stains, and other residues. The glass cleaning step can be conducted with an industrial ultrasonic cleaner, a horizontal spray system or other cleaning technique.

Many of the steps of column A are optional and may be even excluded altogether. For instance the chemically strengthened glass sheet may simply be provided for the process of laminating. Moreover, various steps are optional and may be excluded altogether. For example, after the step 405, the glass sheet may already include the desired thickness as well as the desired dimensions. In such an example, the method may proceed directly from step 405 to step 409 or may even proceed directly to step 411. Moreover, if the glass sheet is sized during step 407, the edge characteristics may be sufficient for the particular application, wherein the method may proceed directly to step 411 without machining the edges during step 409. As further illustrated in column A, the acid etching step 413 and/or the step of cleaning 415 can be skipped depending on the particular application.

The providing and/or preparing block 401 can further include providing and/or preparing the interlayer 213 (column B). For instance, the method can include the step 417 of providing the interlayer. The interlayer can be provided as polyvinyl butyral (PVB) or a SentryGlas® ionomer interlayer although other interlayer types may be provided in further examples as discussed above. In one example, the interlayer 213 can comprise PVB with a thickness of from about 0.1 mm to about 0.8 mm, such as from about 0.3 mm to about 0.76 mm, such as about 0.38 mm. In another example, the interlayer 213 can comprise SentryGlas® ionomer with a thickness of from about 0.1 mm to about 2 mm, such as from about 0.5 mm to about 1.5 mm, such as about 0.89 mm.

In one example, the method can continue to step 419 of cutting the interlayer to the appropriate size for the laminated structure. Still further, the interlayer may be conditioned, for example, to control the moisture content of the interlayer. In one example, the step 421 of conditioning adjusts the moisture content of the interlayer to less than 1%, such as less than or equal to about 0.65%, such as less than or equal to about 0.2%. Controlling the moisture content of the interlayer may be beneficial to help achieve excellent bonding quality of the interlayer during the lamination procedure. If the interlayer comprises PVB, the moisture content may be controlled to be less than or equal to about 0.65%. If SentryGlas® ionomer is used, the moisture content may be controlled to be less than or equal to about 0.2%. Controlling the moisture content can be carried out various ways. For example, the interlayer may be placed in a controlled environment where the temperature and/or humidity are adjusted to achieve the desired moisture content of the interlayer.

As shown in column B, steps of providing and/or preparing the interlayer 213 may be carried out in different orders and/or certain steps may be omitted altogether. For example, the interlayer may be provided with the appropriate size. In such examples, the step 419 of cutting may be omitted. Furthermore, the step of conditioning may be omitted in further examples or may be carried out without the step of cutting or prior to the step of cutting as shown in FIG. 4.

The providing and/or preparing block 401 can further include providing and/or preparing the metal sheet 201 (column C). The method can begin with step 423 of providing the metal sheet 201 including the first face 203 and the second face 205 with the desired thickness extending between the first face 203 and the second face 205. In one example, the metal sheet 201 can be provided as a stainless steel metal sheet 201 although other materials can be used in further examples. In one example, the stainless steel metal sheet 201 may range from 25 Gauge metal sheet (e.g., about 0.5 mm) up to 12 Gauge metal sheet (e.g., about 2 mm). In further examples, the thicknesses may range from 24 Gauge metal sheet (e.g., about 0.64 mm thick stainless steel) up to 16 Gauge metal sheet (e.g., about 1.59 mm thick stainless steel). As such, the thickness T1 of the metal sheet 201 can be from about 0.5 mm to about 2 mm, such as from about 0.64 mm to about 1.59 mm, although other thicknesses may be provided depending on the particular application.

The method can further proceed from the step 423 of providing the metal sheet 201 to the step 425 of cutting or otherwise shaping the metal sheet 201 to including the appropriate dimensions. In one example, laser cutting may be employed to minimize edge deformation that would otherwise affect bonding quality of the interlay and glass sheet at the edge of the metal sheet 201.

After step 425, the method can optionally proceed to step 427 of edge trimming and cleaning. For example, after the cut, the edge of the stainless steel sheet may be trimmed by a mechanical milling or broaching method, and cleaned with a clean wiper or isopropanol. The steel surface can be cleaned with a Teknek (or equivalent) tacky roller to remove surface dust and particulates. The method can then proceed to step 429 of removing any protective film from the steel sheet. For example, the front and back protective films can be removed prior to lamination. As shown, steps 425, 427 and 429 are optional wherein any one of the steps may be omitted and/or the steps may be carried out in various orders as illustrated.

After the chemically strengthened glass sheet 207, interlayer 213 and metal sheet 201 are provided and/or prepared under the preparing block 401, the method can then proceed to the lamination block 403 including the step of attaching the chemically strengthened glass sheet 207 to the first face 203 of the metal sheet 201 with a first interlayer 213 to provide the laminated structure 103 illustrated in FIG. 2. Likewise, the lamination block 403 may also include the step of attaching a second chemically strengthened glass sheet 305 to the second face 205 of the metal sheet 201 with a second interlayer 303 to provide the laminated structure 301 shown in FIG. 3.

Under the lamination block 403, the method can begin by step 431 of building a stack with the interlayer 213 placed between the chemically strengthened glass sheet 207 and the first face 203 of the metal sheet 201 to provide a 3-layer stack (e.g., see FIG. 2). In addition, if desired, the method can continue to build the stack with the second interlayer 303 placed between the second chemically strengthened glass sheet 305 and the second face 205 of the metal sheet 201 to provide a 5-layer stack (e.g., see FIG. 3). The stack 501 can then be secured with pieces of high-temperature polyester tape on at least two edges to prevent shifting.

Figure 5:
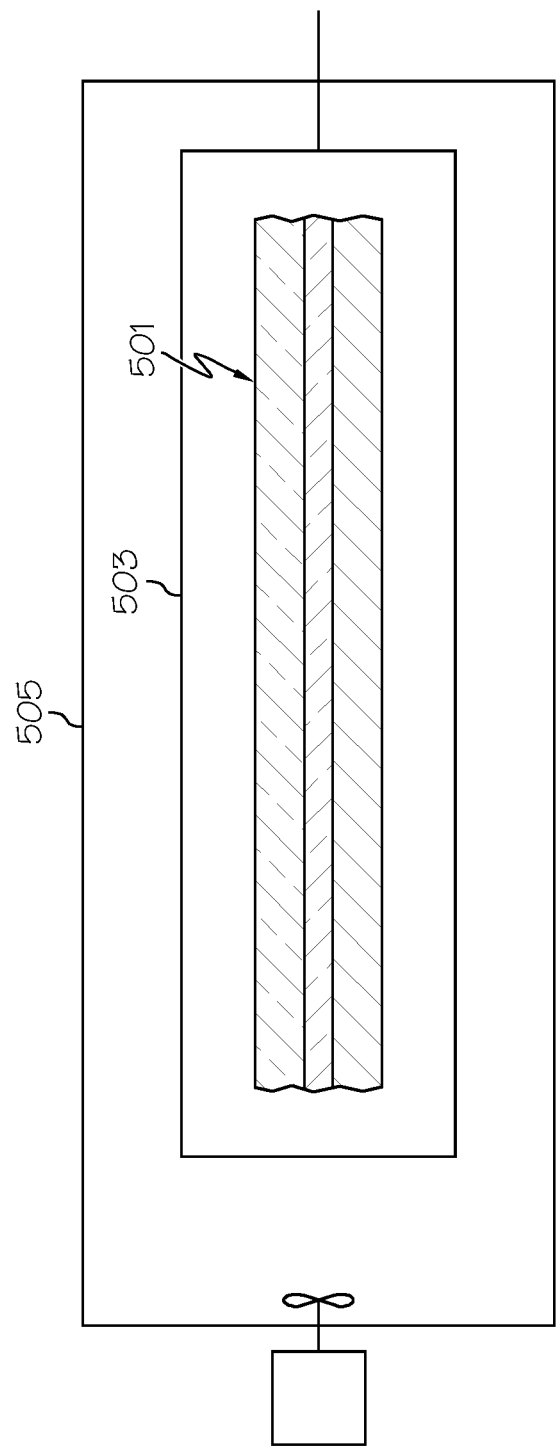
FIG. 5 is a schematic view illustrating the optional step of placing a stack within a vacuum chamber and heating the stack to a lamination temperature to produce the laminated structure in accordance with aspects of the disclosure.

As shown in FIG. 5, the stack 501 can then be placed within a vacuum chamber, such as a vacuum bag 503. In the step of vacuum bagging, these assembled parts may be wrapped in thin breather cloth which is secured by the same tape, then wrapped in looser breather material and placed within a plastic film lamination bag. The parts are arranged in a single layer within the bag. Providing multiple stacks is not ordinarily done, but may be possible for higher throughput. The bag can be heat sealed with a vacuum port attached. For both types of interlayer, the port of the vacuum bag may be attached to a vacuum hose within an autoclave chamber 505 and vacuum is applied with the chamber still open to check for leaks. Other bagged parts are loaded as well, up to the part capacity of the autoclave 505.

As shown in step 433, the vacuum chamber 503 can then be at least partially evacuated and the stack can be heated with a predetermined temperature and pressure profile. For example, the thermal processing step may be carried out with an autoclave wherein specific temperature and pressure profiles are used in order to achieve preferred adhesion (bonding) quality of the laminated structure.

For laminated structures with the PVB interlayer, parts under vacuum within the sealed bag, the temperature may be ramped to the soak temperature of 130° C. (266° F.) at 3° F./minute. When the temperature setpoint is reached, a pressure ramp of 5 psi/minute is initiated until the pressure setpoint of 80 psi is reached. After a soak time of 30 minutes, the temperature is ramped back down at 3° F./minute. Pressure is held at 80 psi until the temperature reaches 50° C. (122° F.) to avoid bubble formation in the PVB, at which point the pressure is also ramped down at 5 psi/minute. After the chamber has cooled and pressure equilibrium is established, the parts are removed from the autoclave, the bagging, breather cloth, and tape is removed, and the parts cleaned of lamination residues.

For glass/steel laminates with the SentryGlas® ionomer interlayer, the cycle is nearly the same, except the ramp rate is 4° F./minute, the soak temperature is 133° C. (272° F.), and the soak time is 60 minutes. The ramp rate can be maintained down to a rate of 4° F./minute until the temperature reaches 210° F. to prevent haze formation in the film. The laminated structure 103, 301 is then provided at the end of the process designated by 435 in FIG. 4.

FIGS. 6-11 show test results performed on various laminated structures to illustrate performance characteristics. In each test, a four inch square laminated structure was placed on a 1 inch thick flexible foam support with the glass sheet facing upwards. A 535 gram ball was then dropped at varying heights from the glass sheet. Once breakage was noted, the corresponding energy corresponding to the height of the ball was recorded. The Weibull plots illustrated in FIGS. 6-11 were created plotting the percent failure vs. the energy at failure. As such, in each plot, the Y-axis (i.e., vertical axis) has the units of percent (%) while the X-axis (i.e., horizontal axis) has the units of Joules (i.e., the energy at failure).

Figure 6:
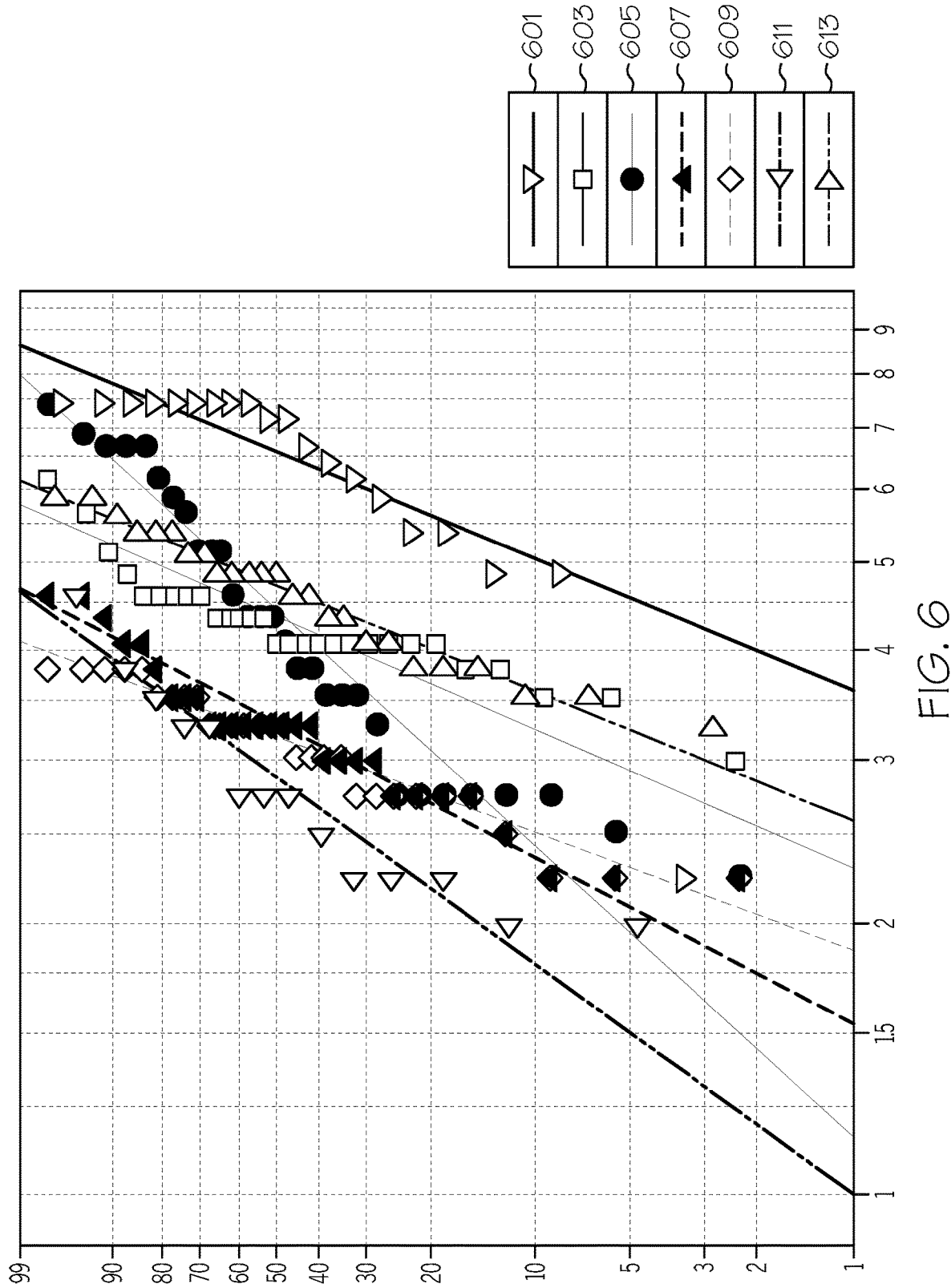
FIG. 6 is a Weibull plot demonstrating impact energy at breakage for six groups of laminated structures in accordance with aspects of the disclosure including 1 mm Corning® Gorilla® glass, 16 Gauge (1.59 mm) stainless steel, and various types of interlayers.

FIG. 6 is a Weibull plot demonstrating impact energy at breakage for six groups of laminated structures in accordance with aspects of the disclosure including 1 mm Corning® Gorilla® glass, 16 Gauge (1.59 mm) stainless steel, and various types of interlayers. Data set 601 represents a laminated structure including an interlayer comprising SentryGlas® ionomer with a thickness of 0.89 mm. Data set 603 represents a laminated structure with an interlayer comprising polyvinyl butyral (PVB) with a thickness of 0.38 mm. Data set 605 represents a laminated structure with an interlayer comprising SentryGlas® ionomer with a thickness of 1.5 mm. Data set 607 represents a laminated structure with an interlayer comprising thermoplastic polyurethane (TPU) with a thickness of 0.34 mm. Data set 609 represents a laminated structure with an interlayer comprising acrylic pressure sensitive adhesive tape (hereinafter "APSAT") with a thickness of 0.05 mm. Data set 611 represents a laminated structure with an interlayer comprising APSAT+PET+APSAT with a thickness of 0.17 mm. The APSAT+PET+APSAT interlayer comprises a PET film in the middle of the laminate that is sandwiched between two layers of APSAT. Data set 613 is a comparative sample for comparison purposes with the six other groups 601,603,605,607,609,611 of laminated structures in accordance with aspects of the disclosure. Data set 613 comprises a fully tempered soda lime glass sheet with a thickness of 4 mm. The data represented by the data sets shown in FIG. 6 is reproduced in Table 1 below wherein the samples in each set are sorted in ascending order of impact energy:

TABLE 1

| Sample | 601 SG0.89 | 603 PVB0.38 | 605 SG1.5 | 607 TPU0.34 | 609 APSAT 0.05 | 611 APSAT + PET + APSAT | 613 SL4 mm |
|---|---|---|---|---|---|---|---|
| 1 | 2.24 | 3.03 | 2.24 | 2.24 | 2.25 | 1.98 | 3.28 |
| 2 | 4.87 | 3.56 | 2.50 | 2.24 | 2.25 | 1.98 | 3.54 |
| 3 | 4.87 | 3.56 | 2.76 | 2.24 | 2.25 | 2.25 | 3.54 |
| 4 | 5.39 | 3.82 | 2.76 | 2.51 | 2.51 | 2.25 | 3.81 |
| 5 | 5.39 | 3.82 | 2.76 | 2.77 | 2.77 | 2.25 | 3.81 |
| 6 | 5.91 | 4.08 | 2.76 | 2.77 | 2.77 | 2.51 | 3.81 |
| 7 | 6.18 | 4.08 | 2.76 | 2.77 | 2.77 | 2.77 | 4.07 |
| 8 | 6.44 | 4.08 | 2.76 | 2.77 | 2.77 | 2.77 | 4.07 |
| 9 | 6.70 | 4.08 | 3.29 | 3.03 | 2.77 | 2.77 | 4.33 |
| 10 | 7.23 | 4.08 | 3.55 | 3.03 | 2.77 | 3.30 | 4.33 |
| 11 | 7.23 | 4.08 | 3.55 | 3.03 | 3.03 | 3.30 | 4.59 |
| 12 | 7.49 | 4.08 | 3.55 | 3.03 | 3.03 | 3.56 | 4.59 |
| 13 | 7.49 | 4.08 | 3.81 | 3.29 | 3.03 | 3.82 | 4.86 |
| 14 | 7.49 | 4.08 | 3.81 | 3.29 | 3.03 | 4.61 | 4.86 |
| 15 | 7.49 | 4.08 | 4.07 | 3.29 | 3.30 | | 4.86 |
| 16 | 7.49 | 4.34 | 4.34 | 3.29 | 3.30 | | 4.86 |
| 17 | 7.49 | 4.34 | 4.34 | 3.29 | 3.30 | | 4.86 |
| 18 | 7.49 | 4.34 | 4.34 | 3.29 | 3.30 | | 5.12 |
| 19 | 7.49 | 4.34 | 4.60 | 3.29 | 3.30 | | 5.12 |
| 20 | 7.49 | 4.34 | 5.12 | 3.29 | 3.30 | | 5.38 |
| 21 | | 4.60 | 5.12 | 3.29 | 3.30 | | 5.38 |
| 22 | | 4.60 | 5.12 | 3.56 | 3.56 | | 5.38 |
| 23 | | 4.60 | 5.65 | 3.56 | 3.56 | | 5.64 |
| 24 | | 4.60 | 5.91 | 3.56 | 3.56 | | 5.90 |
| 25 | | 4.60 | 6.17 | 3.82 | 3.56 | | 5.90 |
| 26 | | 4.87 | 6.70 | 4.08 | 3.82 | | |
| 27 | | 5.13 | 6.70 | 4.08 | 3.82 | | |
| 28 | | 5.65 | 6.70 | 4.34 | 3.82 | | |
| 29 | | 6.18 | 6.96 | 4.60 | 3.82 | | |
| 30 | | | 7.48 | 4.60 | 3.82 | | |

Data sets 605, 607, 609 and 611 of the Weibull plot of FIG. 6 shows that the laminated structures with APSAT, TPU, and 1.5 mm SentryGlas® ionomer do not have comparable impact resistance with a 4 mm sheet of fully tempered soda lime glass represented by data set 613. On the other hand, the laminated structures with 0.38 mm PVB represented by data set 603 is comparably impact-resistant, and the group with 0.89 SentryGlas® ionomer represented by data set 601 has a superior impact resistance, which is much higher than all other data sets 603, 605, 607, 609, 611 and the soda lime 613. Comparing data sets 601 and 605, it is recognized that impact resistance increased with decreased thickness of the SentryGlas Plus® ionomer interlayer.

Figure 7:
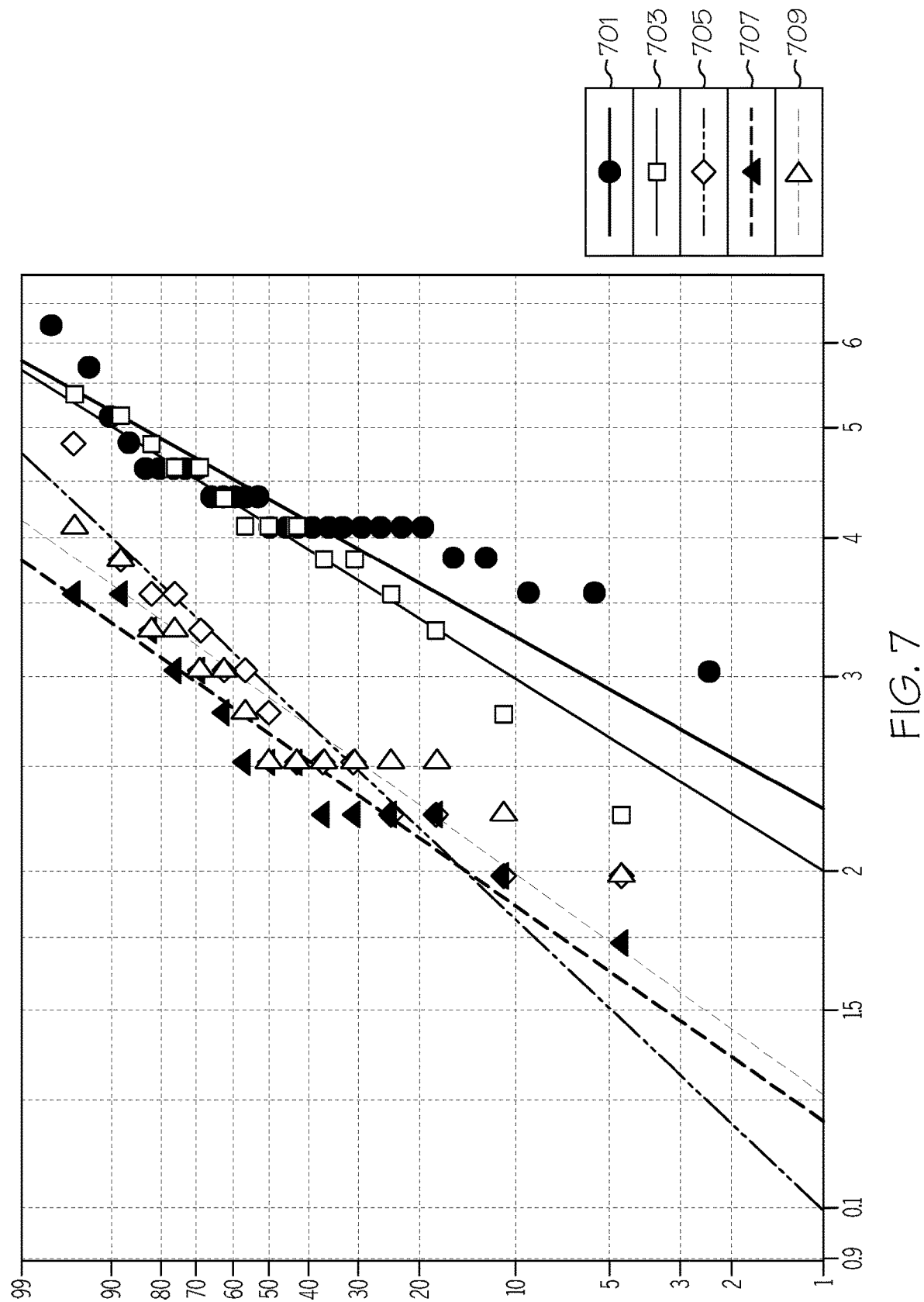
FIG. 7 is a Weibull plot demonstrating impact energy at breakage for five groups of laminated structures in accordance with aspects of the disclosure including 1 mm Corning® Gorilla® glass, a layer of 0.38 mm polyvinyl butyral, and various thicknesses of stainless steel.

FIG. 7 is a Weibull plot demonstrating impact energy at breakage for five groups of laminated structures in accordance with aspects of the disclosure including 1 mm Corning® Gorilla® glass, a layer of 0.38 mm polyvinyl butyral (PVB), and various thicknesses of stainless steel sheets.

Data set 701 represents a laminated structure including a 16 Gauge stainless steel sheet (i.e., 1.59 mm thick). Data set 703 represents a laminated structure including a 18 Gauge stainless steel sheet (i.e., 1.27 mm thick). Data set 705 represents a laminated structure including a 20 Gauge stainless steel sheet (i.e., 0.95 mm thick). Data set 707 represents a laminated structure including a 22 Gauge stainless steel sheet (i.e., 0.79 mm thick). Data set 709 represents a laminated structure including a 24 Gauge stainless steel (i.e., 0.64 mm thick). The data represented by the data sets shown in FIG. 7 is reproduced in Table 2 below wherein the samples in each set are sorted in ascending order of impact energy:

TABLE 2

| Sample | 701 Gauge 16 | 703 Gauge 18 | 705 Gauge 20 | 707 Gauge 22 | 709 Gauge 24 |
|---|---|---|---|---|---|
| 1 | 3.03 | 2.25 | 1.992 | 1.73 | 1.99 |
| 2 | 3.56 | 2.78 | 1.992 | 1.99 | 2.26 |
| 3 | 3.56 | 3.30 | 2.254 | 2.25 | 2.52 |
| 4 | 3.82 | 3.56 | 2.254 | 2.25 | 2.52 |
| 5 | 3.82 | 3.82 | 2.516 | 2.25 | 2.52 |
| 6 | 4.08 | 3.82 | 2.516 | 2.25 | 2.52 |
| 7 | 4.08 | 4.09 | 2.516 | 2.52 | 2.52 |
| 8 | 4.08 | 4.09 | 2.778 | 2.52 | 2.52 |
| 9 | 4.08 | 4.09 | 3.040 | 2.52 | 2.78 |
| 10 | 4.08 | 4.35 | 3.040 | 2.78 | 3.04 |
| 11 | 4.08 | 4.61 | 3.302 | 3.04 | 3.04 |
| 12 | 4.08 | 4.61 | 3.564 | 3.04 | 3.30 |
| 13 | 4.08 | 4.87 | 3.564 | 3.30 | 3.30 |
| 14 | 4.08 | 5.14 | 3.827 | 3.57 | 3.83 |
| 15 | 4.08 | 5.40 | 4.875 | 3.57 | 4.09 |
| 16 | 4.34 | | | | |
| 17 | 4.34 | | | | |
| 18 | 4.34 | | | | |
| 19 | 4.34 | | | | |
| 20 | 4.34 | | | | |
| 21 | 4.60 | | | | |
| 22 | 4.60 | | | | |
| 23 | 4.60 | | | | |
| 24 | 4.60 | | | | |
| 25 | 4.60 | | | | |
| 26 | 4.87 | | | | |
| 27 | 5.13 | | | | |
| 28 | 5.65 | | | | |
| 29 | 6.18 | | | | |

As noted, the three groups of laminates with thinner stainless steel sheet thicknesses (i.e., Gauge 20, Gauge 22, and Gauge 24 thicknesses) cannot achieve as high impact resistance as the two groups with thicker stainless steel sheet thicknesses (i.e., Gauge 16 and Gauge 18 thicknesses).

Figure 8:
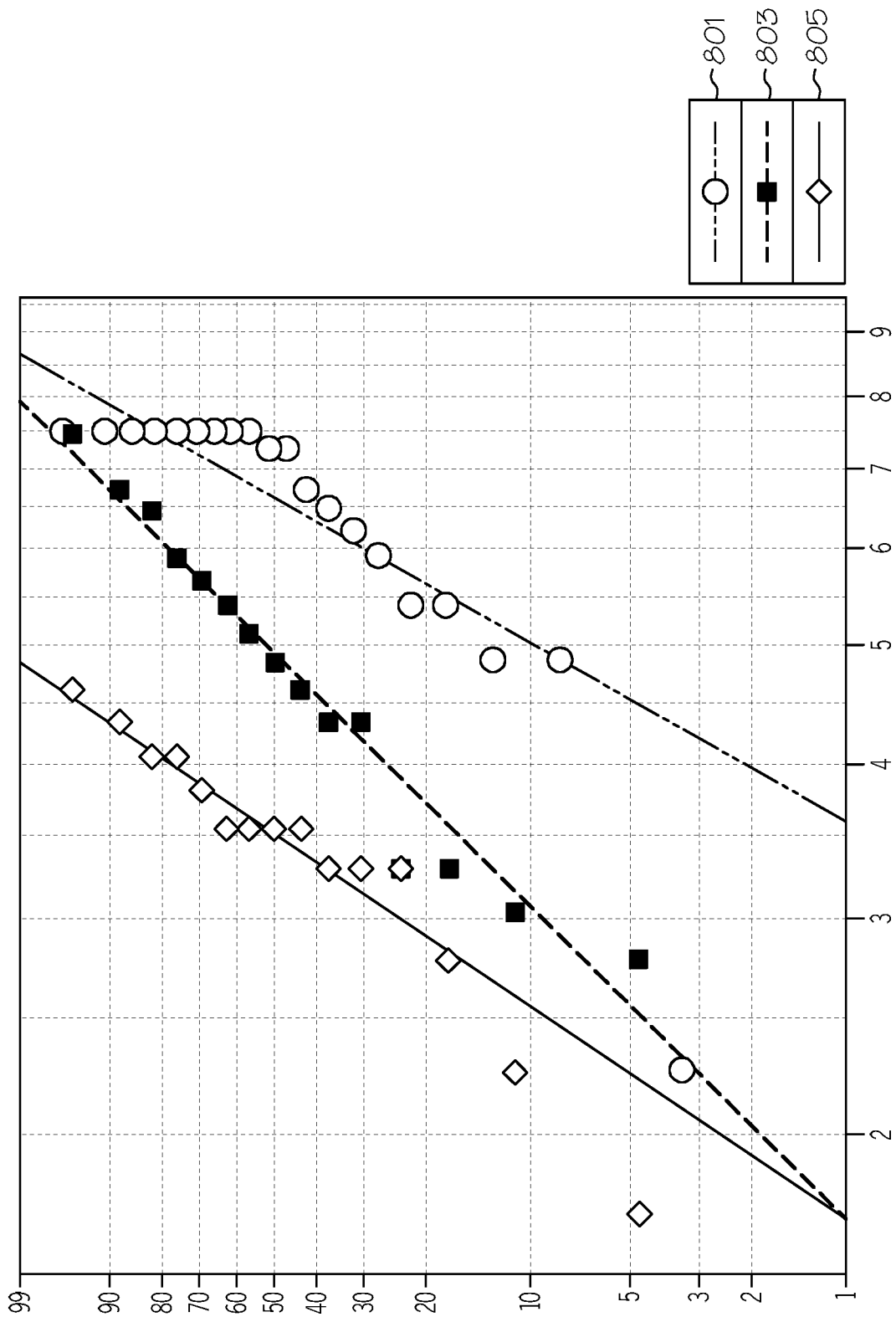
FIG. 8 is a Weibull plot demonstrating impact energy at breakage for three groups of laminated structures in accordance with aspects of the disclosure including 1 mm Corning® Gorilla® glass, a layer of 0.89 mm SentryGlas® ionomer, and various thicknesses of stainless steel.

FIG. 8 is a Weibull plot demonstrating impact energy at breakage for three groups of laminated structures in accordance with aspects of the disclosure including 1 mm Corning® Gorilla® glass, a layer of 0.89 mm SentryGlas® ionomer, and various thicknesses of stainless steel sheets. Data set 801 represents a laminated structure including a 16 Gauge stainless steel sheet (i.e., 1.59 mm thick). Data set 803 represents a laminated structure including a 22 Gauge stainless steel sheet (i.e., 0.79 mm thick). Data set 805 represents a laminated structure including a 24 Gauge stainless steel (i.e., 0.64 mm thick). The data represented by the data sets shown in FIG. 8 is reproduced in Table 3 below wherein the samples in each set are sorted in ascending order of impact energy:

TABLE 3

| Sample | 801 Gauge 16 | 803 Gauge 22 | 805 Gauge 24 |
|---|---|---|---|
| 1 | 2.24 | 2.77 | 1.73 |
| 2 | 4.87 | 3.04 | 2.25 |
| 3 | 4.87 | 3.30 | 2.78 |
| 4 | 5.39 | 3.30 | 3.30 |
| 5 | 5.39 | 4.35 | 3.30 |
| 6 | 5.91 | 4.35 | 3.30 |
| 7 | 6.18 | 4.61 | 3.56 |
| 8 | 6.44 | 4.87 | 3.56 |
| 9 | 6.70 | 5.13 | 3.56 |
| 10 | 7.23 | 5.40 | 3.56 |
| 11 | 7.23 | 5.66 | 3.82 |
| 12 | 7.49 | 5.92 | 4.09 |
| 13 | 7.49 | 6.44 | 4.09 |
| 14 | 7.49 | 6.71 | 4.35 |
| 15 | 7.49 | 7.49 | 4.61 |
| 16 | 7.49 | | |
| 17 | 7.49 | | |
| 18 | 7.49 | | |
| 19 | 7.49 | | |
| 20 | 7.49 | | |

As these data show, the presence of 0.89 mm SentryGlas® ionomer provides impressive impact resistance. Indeed, as shown by data set 803, even the laminated structures with a thinner steel layer (as thin as 0.79 mm) reaches a comparable impact resistance with the fully tempered 4 mm Soda Lime (see data set 613 in FIG. 6) or the laminated structures with 1 mm Gorilla glass plus 0.38 PVB plus 1.59 mm steel (see data set 603 in FIG. 6). As shown by data set 801, laminate structures with 1.59 mm stainless steel and 0.89 mm SentryGlas® ionomer has the highest impact resistance.

Figure 9:
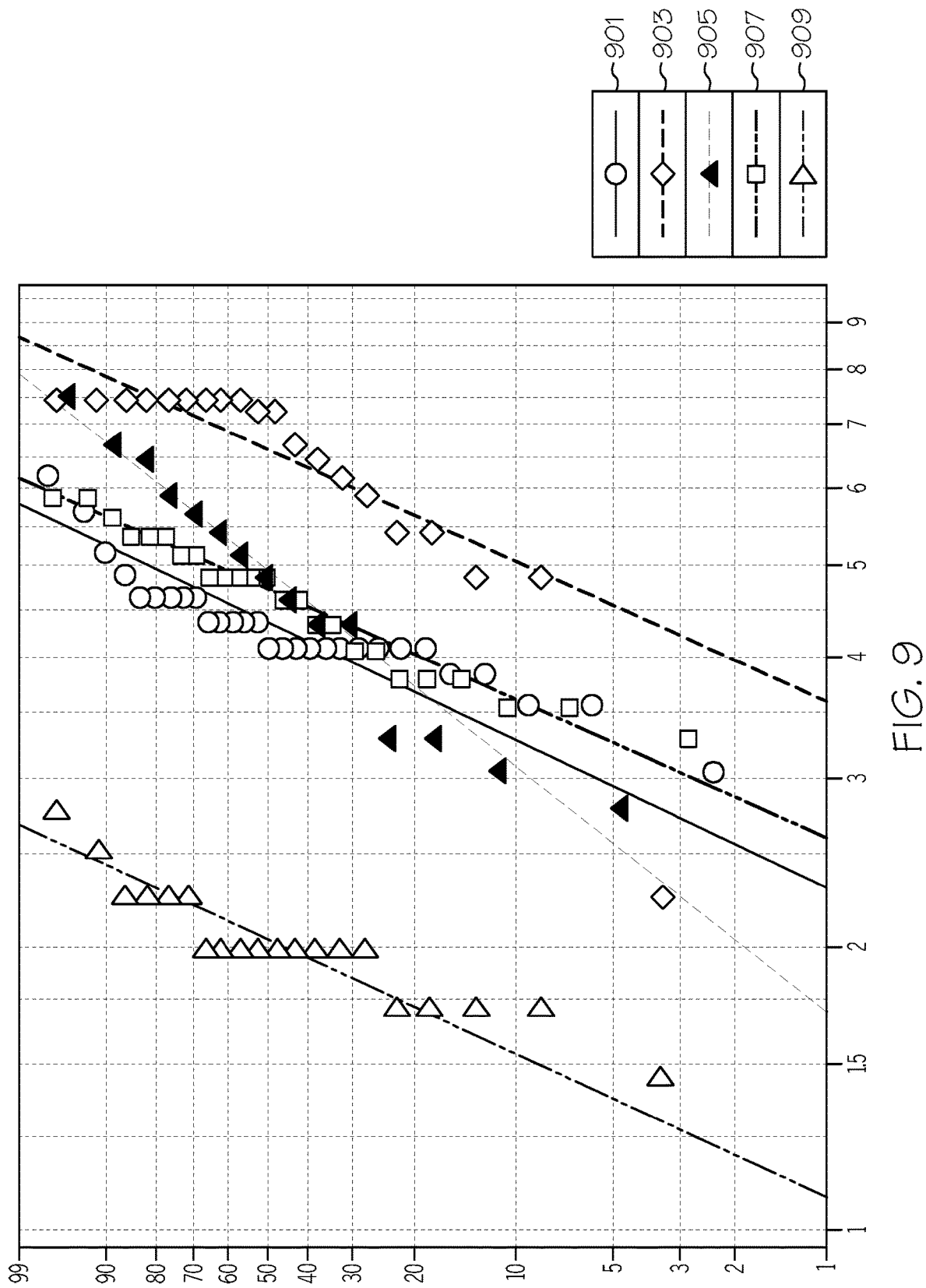
FIG. 9 is a Weibull plot demonstrating impact energy at breakage for three groups of laminated structures in accordance with aspects of the disclosure including 1 mm Corning® Gorilla® glass compared to two groups of fully tempered 4 mm Soda Lime glass.

FIG. 9 is a Weibull plot demonstrating impact energy at breakage for three groups of laminated structures in accordance with aspects of the disclosure including 1 mm Corning® Gorilla® glass compared to two groups of fully tempered 4 mm Soda Lime glass. Data set 901 represents a laminated structure including a 16 Gauge stainless steel sheet (i.e., 1.59 mm thick) with a PVB interlayer having a thickness of 0.38 mm. Data set 903 represents a laminated structure including a 16 Gauge stainless steel sheet (i.e., 1.59 mm thick) with a 0.89 mm SentryGlas® ionomer as the interlayer. Data set 905 represents a laminated structure including a 22 Gauge stainless steel sheet (i.e., 0.79 mm thick) with a 0.89 mm SentryGlas® ionomer as the interlayer. For comparison purposes, two sets of soda lime glass where added. Data set 907 represents fully tempered soda lime glass with a thickness of 4 mm. Data set 909 represents fully tempered soda lime glass with a thickness of 4 mm with a black frit coating added. The data represented by the data sets shown in FIG. 9 is reproduced in Table 4 below wherein the samples in each set are sorted in ascending order of impact energy:

TABLE 4

| Sample | 901 PVB0.38 Steel 1.59 | 903 SG0.89 Steel 1.59 | 905 SG0.89 Steel 0.79 | 907 SL4 mm | 909 FT SL4 mm w/Frit |
|---|---|---|---|---|---|
| 1 | 3.03 | 2.24 | 2.77 | 3.28 | 1.45 |
| 2 | 3.56 | 4.87 | 3.04 | 3.54 | 1.71 |
| 3 | 3.56 | 4.87 | 3.30 | 3.54 | 1.71 |
| 4 | 3.82 | 5.39 | 3.30 | 3.81 | 1.71 |
| 5 | 3.82 | 5.39 | 4.35 | 3.81 | 1.71 |
| 6 | 4.08 | 5.91 | 4.35 | 3.81 | 1.97 |
| 7 | 4.08 | 6.18 | 4.61 | 4.07 | 1.97 |
| 8 | 4.08 | 6.44 | 4.87 | 4.07 | 1.97 |
| 9 | 4.08 | 6.70 | 5.13 | 4.33 | 1.97 |

TABLE 4-continued

| Sample | 901<br>PVB0.38<br>Steel 1.59 | 903<br>SG0.89<br>Steel 1.59 | 905<br>SG0.89<br>Steel 0.79 | 907<br>SL4 mm | 909<br>FT SL4 mm<br>w/Frit |
|---|---|---|---|---|---|
| 10 | 4.08 | 7.23 | 5.40 | 4.33 | 1.97 |
| 11 | 4.08 | 7.23 | 5.66 | 4.59 | 1.97 |
| 12 | 4.08 | 7.49 | 5.92 | 4.59 | 1.97 |
| 13 | 4.08 | 7.49 | 6.44 | 4.86 | 1.97 |
| 14 | 4.08 | 7.49 | 6.71 | 4.86 | 1.97 |
| 15 | 4.08 | 7.49 | 7.49 | 4.86 | 2.23 |
| 16 | 4.34 | 7.49 |  | 4.86 | 2.23 |
| 17 | 4.34 | 7.49 |  | 4.86 | 2.23 |
| 18 | 4.34 | 7.49 |  | 5.12 | 2.23 |
| 19 | 4.34 | 7.49 |  | 5.12 | 2.50 |
| 20 | 4.34 | 7.49 |  | 5.38 | 2.76 |
| 21 | 4.60 |  |  | 5.38 |  |
| 22 | 4.60 |  |  | 5.38 |  |
| 23 | 4.60 |  |  | 5.64 |  |
| 24 | 4.60 |  |  | 5.90 |  |
| 25 | 4.60 |  |  | 5.90 |  |
| 26 | 4.87 |  |  |  |  |
| 27 | 5.13 |  |  |  |  |
| 28 | 5.65 |  |  |  |  |
| 29 | 6.18 |  |  |  |  |

Figure 10:
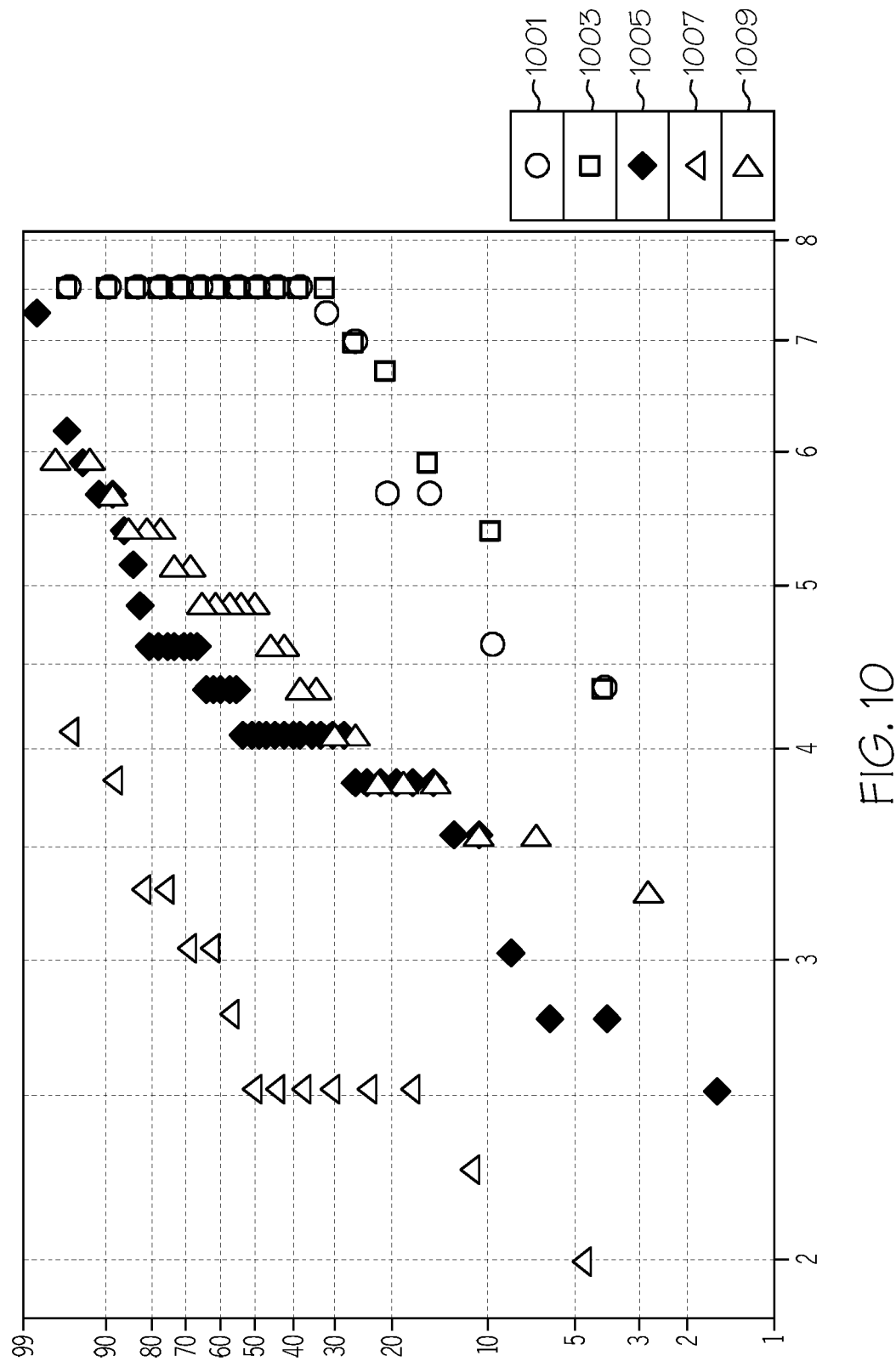
FIG. 10 is a Weibull plot demonstrating impact energy at breakage for two groups of laminated structures in accordance with aspects of the disclosure including 1 mm Corning® Gorilla® glass, 0.38 mm polyvinyl butyral together with two alternative stainless steel sheets [i.e., 16 Gauge (1.59 mm) and 24 Gauge (0.64 mm)] compared to another two groups of laminated structures in accordance with aspects of the disclosure including acid-etched 1 mm Corning® Gorilla® glass, 0.38 mm polyvinyl butyral together with two alternative stainless steel sheets [i.e., 16 Gauge (1.59 mm) and 24 Gauge (0.64 mm)]

FIG. 10 is a Weibull plot demonstrating impact energy at breakage for two groups of laminated structures in accordance with aspects of the disclosure including 1 mm Corning® Gorilla® glass, 0.38 mm polyvinyl butyral (PVB) together with two alternative stainless steel sheets. Data set 1005 represents 16 Gauge (1.59 mm) stainless steel sheet and data set 1007 represents 24 Gauge (0.64 mm) stainless steel sheet. FIG. 10 further shows impact energy at breakage for two groups of laminated structures in accordance with aspects of the disclosure including acid-etched 1 mm Corning® Gorilla® glass, 0.38 mm polyvinyl butyral (PVB) together with two alternative stainless steel sheets. Data set 1003 represents 16 Gauge (1.59 mm) stainless steel sheet and data set 1001 represents 24 Gauge (0.64 mm) stainless steel sheet. For comparative purposes, data set 1009 represents fully tempered soda lime glass sheet with a thickness of 4 mm. The data represented by the data sets shown in FIG. 10 is reproduced in Tables 5a and 5b below wherein the samples in each set are sorted in ascending order of impact energy:

TABLE 5a

| Sample | 1001<br>F_GG1<br>Gauge 24 | 1003<br>F_GG1<br>Gauge 16 | 1005<br>IOXed_GG1<br>Gauge 16 | 1007<br>IOXed_GG1<br>Gauge 24 | 1009<br>SL4 mm |
|---|---|---|---|---|---|
| 1 | 4.34 | 4.34 | 2.51 | 1.99 | 3.28 |
| 2 | 4.60 | 5.39 | 2.77 | 2.26 | 3.54 |
| 3 | 5.65 | 5.91 | 2.77 | 2.52 | 3.54 |
| 4 | 5.65 | 6.70 | 3.03 | 2.52 | 3.81 |
| 5 | 6.96 | 6.96 | 3.56 | 2.52 | 3.81 |
| 6 | 7.23 | 7.49 | 3.56 | 2.52 | 3.81 |
| 7 | 7.49 | 7.49 | 3.82 | 2.52 | 4.07 |
| 8 | 7.49 | 7.49 | 3.82 | 2.52 | 4.07 |
| 9 | 7.49 | 7.49 | 3.82 | 2.78 | 4.33 |
| 10 | 7.49 | 7.49 | 3.82 | 3.04 | 4.33 |
| 11 | 7.49 | 7.49 | 3.82 | 3.04 | 4.59 |
| 12 | 7.49 | 7.49 | 3.82 | 3.30 | 4.59 |
| 13 | 7.49 | 7.49 | 4.08 | 3.30 | 4.86 |
| 14 | 7.49 | 7.49 | 4.08 | 3.83 | 4.86 |
| 15 | 7.49 | 7.49 | 4.08 | 4.09 | 4.86 |
| 16 | 7.49 | 7.49 | 4.08 |  | 4.86 |
| 17 | 7.49 | 7.49 | 4.08 |  | 4.86 |
| 18 |  |  | 4.08 |  | 5.12 |
| 19 |  |  | 4.08 |  | 5.12 |
| 20 |  |  | 4.08 |  | 5.38 |

TABLE 5b

| Sample | 1001<br>F_GG1<br>Gauge 24 | 1003<br>F_GG1<br>Gauge 16 | 1005<br>IOXed_GG1<br>Gauge 16 | 1007<br>IOXed_GG1<br>Gauge 24 | 1009<br>SL4 mm |
|---|---|---|---|---|---|
| 21 |  |  | 4.08 |  | 5.38 |
| 22 |  |  | 4.08 |  | 5.38 |
| 23 |  |  | 4.08 |  | 5.64 |
| 24 |  |  | 4.08 |  | 5.90 |
| 25 |  |  | 4.34 |  | 5.90 |
| 26 |  |  | 4.34 |  |  |
| 27 |  |  | 4.34 |  |  |
| 28 |  |  | 4.34 |  |  |
| 29 |  |  | 4.34 |  |  |
| 30 |  |  | 4.60 |  |  |
| 31 |  |  | 4.60 |  |  |
| 32 |  |  | 4.60 |  |  |
| 33 |  |  | 4.60 |  |  |
| 34 |  |  | 4.60 |  |  |
| 35 |  |  | 4.60 |  |  |

TABLE 5b-continued

| Sample | 1001 F_GG1 Gauge 24 | 1003 F_GG1 Gauge 16 | 1005 IOXed_GG1 Gauge 16 | 1007 IOXed_GG1 Gauge 24 | 1009 SL4 mm |
|---|---|---|---|---|---|
| 36 | | | 4.60 | | |
| 37 | | | 4.87 | | |
| 38 | | | 5.13 | | |
| 39 | | | 5.39 | | |
| 40 | | | 5.65 | | |
| 41 | | | 5.65 | | |
| 42 | | | 5.91 | | |
| 43 | | | 6.18 | | |
| 44 | | | 7.23 | | |

As demonstrated by data sets 1001 and 1003, both acid-etched Corning® Gorilla® glass laminated structures have superior impact performance when compared to non-acid treated chemically strengthened glass laminated structures and when compared to 4 mm soda lime glass.

Figure 11:
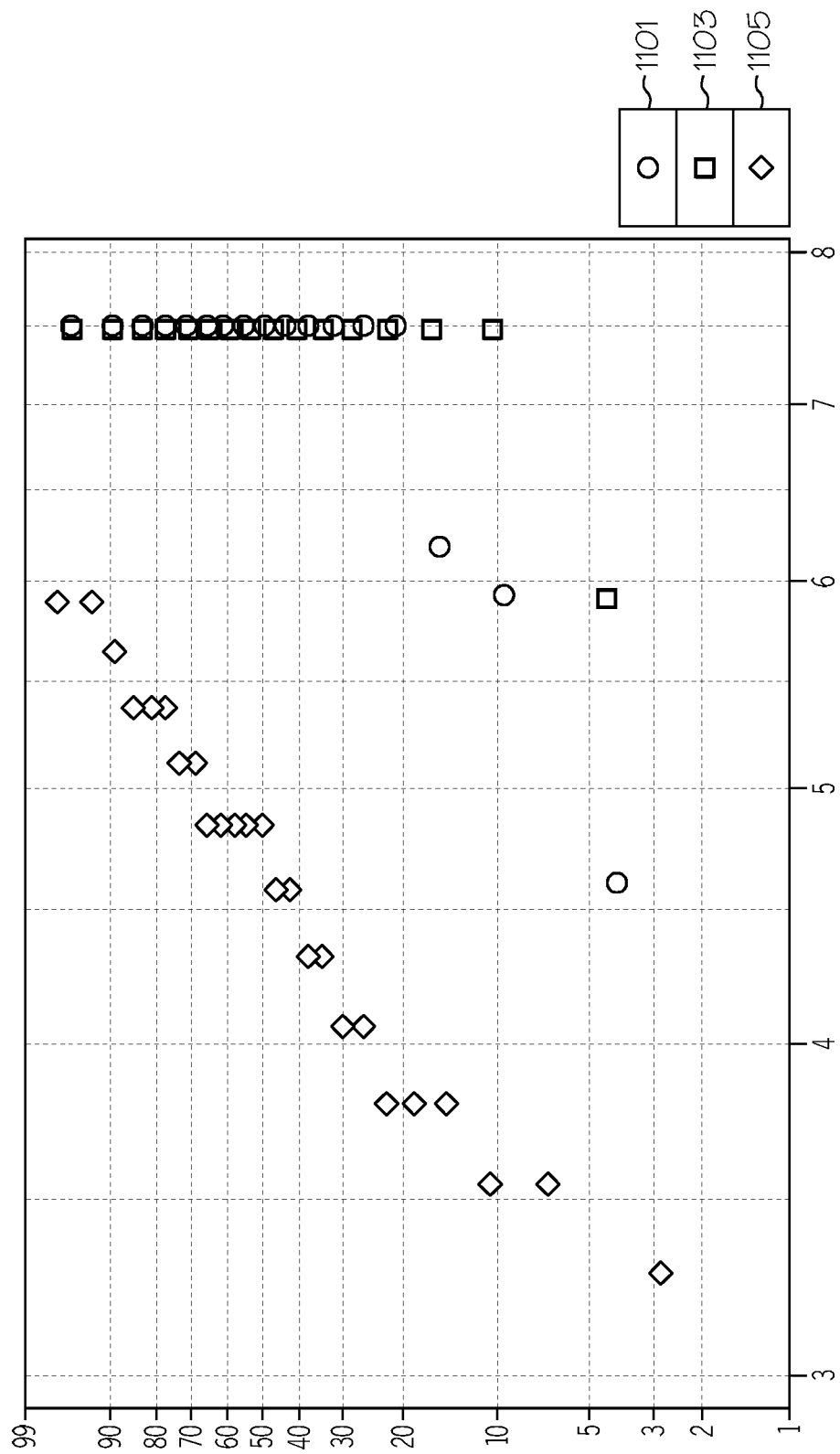
FIG. 11 is a Weibull plot demonstrating impact energy at breakage for two groups of laminated structures in accordance with aspects of the disclosure including acid-etched 0.7 mm Corning® Gorilla® glass, a layer of 0.89 mm SentryGlas® ionomer together with two alternative stainless steel sheets [i.e., 16 Gauge (1.59 mm) and 24 Gauge (0.64 mm)].

FIG. 11 is a Weibull plot demonstrating impact energy at breakage for two groups of laminated structures in accordance with aspects of the disclosure including acid-etched 0.7 mm Corning® Gorilla® glass, a layer of 0.89 mm SentryGlas® ionomer together with two alternative stainless steel sheets. Data set 1103 represents 16 Gauge (1.59 mm) stainless steel sheet. Data set 1101 represents 24 Gauge (0.64 mm) stainless steel sheet. For comparative purposes, data set 1105 represents fully tempered soda lime glass sheet with a thickness of 4 mm. The data represented by the data sets shown in FIG. 11 is reproduced in Table 6 below wherein the samples in each set are sorted in ascending order of impact energy:

TABLE 6

| Sample | 1101 F_GG07 Gauge 24 | 1103 F_GG07 Gauge 16 | 1105 SL4 mm |
|---|---|---|---|
| 1 | 4.60 | 5.91 | 3.28 |
| 2 | 5.91 | 7.49 | 3.54 |
| 3 | 6.18 | 7.49 | 3.54 |
| 4 | 7.49 | 7.49 | 3.81 |
| 5 | 7.49 | 7.49 | 3.81 |
| 6 | 7.49 | 7.49 | 3.81 |
| 7 | 7.49 | 7.49 | 4.07 |
| 8 | 7.49 | 7.49 | 4.07 |
| 9 | 7.49 | 7.49 | 4.33 |
| 10 | 7.49 | 7.49 | 4.33 |
| 11 | 7.49 | 7.49 | 4.59 |
| 12 | 7.49 | 7.49 | 4.59 |
| 13 | 7.49 | 7.49 | 4.86 |
| 14 | 7.49 | 7.49 | 4.86 |
| 15 | 7.49 | 7.49 | 4.86 |
| 16 | 7.49 | 7.49 | 4.86 |
| 17 | 7.49 | | 4.86 |
| 18 | | | 5.12 |
| 19 | | | 5.12 |
| 20 | | | 5.38 |
| 21 | | | 5.38 |
| 22 | | | 5.38 |
| 23 | | | 5.64 |
| 24 | | | 5.90 |
| 25 | | | 5.90 |

FIG. 11 demonstrates that thinner sheets of glass comprising acid-etched 0.7 mm Corning® Gorilla® glass used in a laminated structure can be used with thin sheets of steel (e.g., 24 Gauge—0.64 mm thick stainless steel) with a layer of 0.89 mm SentryGlas® ionomer and still achieve superior impact performance when compared to 4 mm soda lime glass. As such, the experimental results demonstrate that acid-etched Corning® Gorilla® glass indeed has the ability to enable the use of thinner steel (like 24 Gauge) for the construction of highly impact resistant glass/steel laminates, even with 0.7 mm Gorilla® glass.

As described above, laminated structures can comprise a metal sheet including a first face and a second face with a thickness of from about 0.5 mm to about 2 mm extending between the first face and the second face. The laminated structures can further include a first chemically strengthened glass sheet including a thickness of less than or equal to about 1.1 mm. The laminated structures can still further include a first interlayer attaching the first chemically strengthened glass sheet to the first face of the metal sheet. In illustrative examples, the laminated structures can comprise: 1) at least one layer of thin Corning® Gorilla® glass (e.g., with a thickness of 0.7 mm or 1.0 mm) as the outermost surface, 2) at least one layer of polymer interlayer (0.38 mm Polyvinyl butyral (PVB) or 0.89 mm SentryGlas® ionomer), and 3) a layer of stainless steel (e.g., ranging from 24 Gauge to 16 Gauge, about 0.635 mm to 1.59 mm).

Laminated structures of the present disclosure have a number of advantages over fully tempered soda lime and stainless steel. For example, laminated structures of the present disclosure can achieve either comparable or much superior performance in impact resistance over the fully tempered soda lime mono-layers (as thick as 4 mm). In addition, the laminated structures of the present disclosure are able to retain glass fragments in place if they break, while if the thick fully tempered soda lime breaks it will release glass chips to the surrounding environment. Compared to stainless steel monolithic structures, the presence of glass in laminated structures of the present disclosure enables higher hardness and therefore higher scratch resistance, and as a result it can help maintain the fresh aesthetic looks of the steel surface over a longer time.

Still further aspects of the disclosure can include optional processing techniques for use during a method of manufacturing the laminated structure that may provide further beneficial features to the laminated structure. For example, processing techniques can optionally include preparation steps for the glass sheet including a scoring and breaking step, edge finishing, ion exchange to apply the compressive surface layer and acid etching to further reduce glass surface flaws. In further examples further optional processing techniques can include decoration of the glass or other components to provide the glass with a decorated appearance. For the interlayer, processing techniques can optionally include proper conditioning of the interlayer (e.g., PVB or SentryGlas® ionomer) to improve bonding strength. For the steel layer, processing techniques can optionally include laser cutting so as to avoid the edge deformation caused by mechanical methods. During the step of lamination, the present disclosure can further include the step of vacuum applied thermal processing with the specific thermal cycling profiles that may be customized for various interlayers (e.g., PVB and SentryGlas® ionomer interlayers), for the purpose of improved bonding strength and reduced air bubbles.

Advantages of some example embodiments of the disclosure can produce high quality laminated structures with one or two layers of relatively thin glass (e.g., less than or equal to 1.1 mm). Moreover, by use of various processing techniques for stainless steel laminated applications, the laminated structures have the ability to maintain the aesthetic look of brushed stainless steel during a longer service time. Moreover, laminated structures of the present disclosure circumvent typical issues of low impact resistance caused by "localized deformation" that might otherwise occur with other laminate structures with a relatively thin glass layer. Furthermore, laminated structures of the present disclosure can feature comparable or even better impact resistance than 4 mm fully tempered soda lime glass. Still further, if breakage of the glass occurs, the interlayer of laminated structures can help anchor the broken glass segments from being released to the surrounding environment. In addition, example laminated structures can employ acid etching to enabled the use of thinner steel like 24 Gauge (0.635 mm) for glass/steel laminates without any deterioration in impact resistance.

As such, the disclosure further presents laminate structures that protect a metal sheet with a glass sheet to avoid scratching of the metal sheet and soiling the surface of the glass sheet. Indeed, any smudges or dirt may be easily removed from the surface of the glass sheet in a convenient manner that may be more difficult to remove from an unprotected metal surface. In some examples, the glass sheets can be laminated to a stainless steel metal sheet to provide an attractive look that has enhanced scratch resistance, and relatively easy cleanability, for example, with respect to fingerprints, oil smudges, microbial contaminants, etc. The glass sheet can thereby help preserve the aesthetic look of the stainless steel and can help facilitate cleaning and maintenance of the surface of the laminated structure.

Moreover, the glass sheet of the laminated structure can provide the stainless steel metal sheet with increased resistance to plastic deformation under sharp impact. As such, providing the laminate structure can permit the glass sheet to help shield the metal sheet from impacts that may otherwise dent or damage the metal sheet. The glass sheet can also increase the chemical/electrochemical stability when compared to a stainless steel metal sheet, thereby preserving the surface characteristics of the stainless steel.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A laminated structure comprising:
   a stainless-steel metal sheet including a first face and a second face with a thickness of from about 0.5 mm to about 2 mm extending between the first face and the second face;
   a first chemically strengthened glass sheet including a thickness of less than or equal to about 1.1 mm, wherein the first chemically strengthened glass sheet comprises a glass sheet selected from the group consisting of aluminosilicate glass and alkali-aluminoborosilicate glass; and
   a first transparent interlayer attaching the first chemically strengthened glass sheet to the first face of the metal sheet,
   wherein, when the laminate is placed on a 1 inch thick flexible foam support and the first chemically strengthened glass sheet is impacted with a 535 g ball, the laminate exhibits impact energy of from 4.34 Joules to 7.49 Joules.

2. The laminated structure of claim 1, wherein the first interlayer comprises layer of polyvinyl butyral.

3. The laminated structure of claim 2, wherein the layer of polyvinyl butyral includes a thickness of from about 0.1 mm to about 0.8 mm.

4. The laminated structure of claim 1, wherein the first interlayer comprises an ionomer.

5. The laminated structure of claim 4, wherein the thickness of the first interlayer is from about 0.1 mm to about 2 mm.

6. The laminated structure of claim 1, wherein the Young's modulus of the first interlayer is greater than or equal to 15 MPa.

7. The laminated structure of claim 6, wherein the Young's modulus of the first interlayer is greater than or equal to 275 MPa.

8. The laminated structure of claim 1, wherein the first chemically strengthened glass sheet comprises an acid-etched glass sheet.

9. The laminated structure of claim 1, wherein the first chemically strengthened glass sheet includes a thickness of from about 0.5 mm to about 1.1 mm.

10. The laminated structure of claim 1, further comprising:
    a second glass sheet including a thickness of less than or equal to about 1.1 mm; and
    a second interlayer attaching the second glass sheet to the second face of the metal sheet.

* * * * *